US011064862B2

(12) United States Patent
Yoon et al.

(10) Patent No.: US 11,064,862 B2
(45) Date of Patent: Jul. 20, 2021

(54) DISHWASHING SYSTEM

(71) Applicants: FANUC CORPORATION, Yamanashi (JP); YOSHINOYA HOLDINGS CO., LTD., Tokyo (JP)

(72) Inventors: Woo-Keun Yoon, Tokyo (JP); Hiroaki Matsuda, Tokyo (JP)

(73) Assignees: FANUC CORPORATION, Yamanashi (JP); YOSHINOYA HOLDINGS CO., LTD., Tokyo (JP)

(*) Notice: Subject to any disclaimer, the term of this patent is extended or adjusted under 35 U.S.C. 154(b) by 67 days.

(21) Appl. No.: 16/273,000

(22) Filed: Feb. 11, 2019

(65) Prior Publication Data
US 2019/0167068 A1 Jun. 6, 2019

Related U.S. Application Data

(63) Continuation of application No. PCT/JP2017/029233, filed on Aug. 11, 2017.

(30) Foreign Application Priority Data

Aug. 14, 2016 (JP) .............................. JP2016-159050

(51) Int. Cl.
*A47L 15/46* (2006.01)
*B25J 13/08* (2006.01)
(Continued)

(52) U.S. Cl.
CPC ............... *A47L 15/46* (2013.01); *A47L 15/24* (2013.01); *B25J 9/042* (2013.01); *B25J 9/1679* (2013.01); *B25J 13/08* (2013.01)

(58) Field of Classification Search
CPC .................. B25J 11/0085; B25J 11/008; B25J 9/16–1694; B25J 13/04; A47L 15/00–508
See application file for complete search history.

(56) References Cited

U.S. PATENT DOCUMENTS

| 5,329,952 A | * | 7/1994 | Kojima | .................. A47L 15/24 134/133 |
| 2005/0072449 A1 | * | 4/2005 | Alpert | ................. A47L 15/4242 134/25.1 |

(Continued)

FOREIGN PATENT DOCUMENTS

| JP | S61-173873 A | 8/1986 |
| JP | H10-320521 A | 12/1998 |

(Continued)

OTHER PUBLICATIONS

Kosuge et al., Development of Automatic Dishwashing Robot System, 2009, IEEE (Year: 2009).*

(Continued)

*Primary Examiner* — Michael E Barr
*Assistant Examiner* — Omair Chaudhri
(74) *Attorney, Agent, or Firm* — Nakanishi IP Associates, LLC

(57) ABSTRACT

A dishwashing system includes: a dishwasher that washes tableware contained in a dishwashing rack, inside a washing chamber; a carry-in stand for placing the dishwashing rack that is to be carried into the washing chamber on; a carry-out stand for placing the dishwashing rack that is carried out from the washing chamber on; and a robot device including a robot arm mechanism. The carry-in stand and the dishwasher are arranged within a movable range of the robot arm mechanism. The robot arm mechanism transfers the dishwashing rack from the carry-in stand to the washing chamber, and also operates the dishwasher.

9 Claims, 8 Drawing Sheets

(51) Int. Cl.
  *B25J 9/04* (2006.01)
  *B25J 9/16* (2006.01)
  *A47L 15/24* (2006.01)

(56) References Cited

U.S. PATENT DOCUMENTS

| | | | |
|---|---|---|---|
| 2007/0034236 A1* | 2/2007 | Reichold | A47L 15/0081 |
| | | | 134/18 |
| 2010/0043834 A1* | 2/2010 | Scheringer | A47L 15/241 |
| | | | 134/25.2 |
| 2014/0350714 A1 | 11/2014 | Kimura et al. | |
| 2016/0338567 A1* | 11/2016 | Kong | A61L 2/18 |
| 2017/0023947 A1* | 1/2017 | McMillion | B64D 1/22 |
| 2017/0172371 A1* | 6/2017 | Engesser | A47L 15/4282 |
| 2017/0225321 A1* | 8/2017 | Deyle | B25J 9/1679 |
| 2017/0273534 A1* | 9/2017 | Alpert | A61L 2/18 |
| 2018/0036889 A1* | 2/2018 | Birkmeyer | B25J 9/1697 |
| 2018/0110393 A1* | 4/2018 | Fisher | G06Q 30/0645 |

FOREIGN PATENT DOCUMENTS

| | | |
|---|---|---|
| JP | 2000-181522 A | 6/2000 |
| JP | 2004-188527 A | 7/2004 |
| JP | 2006-334232 A | 12/2006 |
| JP | 2007-069239 A | 3/2007 |
| JP | 2009-000349 A | 1/2009 |
| JP | 2013-150511 A | 8/2013 |
| JP | 2014-156000 A | 8/2014 |
| JP | 2014-229757 A | 12/2014 |
| JP | 2015-084892 A | 5/2015 |

OTHER PUBLICATIONS

Kazumichi Moriyama, Tohoku University announces "dishwashing and storage partner robot"—commercial dishwashing work alternative robot, Mar. 25, 2009, Robot Watch, https://robot.watch.impress.co.jp/cda/news/2009/03/25/1677.html (Year: 2009).*

International Search Report issued in PCT/JP2017/029233 dated Oct. 31, 2017 with English Translation (5 pages).

Office Action issued in Japanese Patent Application No. 2018-534391 dated Oct. 20, 2020, with English Translation (16 pages).

Tohoku University, "Cleaning and storing partner robots," [search on Jul. 19, online], 2006, search on Sep. 29, Impress Watch Corporation, an Impress Group company, [2020], Internet <URLhttps://robot.watch.impress.co.jp/cda/news2009/03/25/1677.html>, with English Translation (9 pages).

* cited by examiner

DISHWASHING SYSTEM

CROSS-REFERENCE TO RELATED APPLICATIONS

This application is a continuation application of International Patent Application No. PCT/JP2017/029233 filed on Aug. 11, 2017, which is based upon and claims the benefit of priority from the prior Japanese Patent Application No. 2016-159050, filed Aug. 14, 2016 the entire contents of which are incorporated herein by reference.

FIELD

Embodiments described herein relate to a dishwashing system.

BACKGROUND

Due to a shortage of labor, one of the important tasks that currently faces the food service industry is to achieve labor savings. The introduction of dishwashers is one measure for achieving such labor savings. The process of washing dishes involves removing leftover food from tableware on a return shelf, immersing the tableware in a clipping sink, and thereafter performing preliminary washing of the tableware using a brush or the like, and then placing the tableware on a washing rack. The washing rack on which the tableware has been placed is carried into a dishwasher and set at a predetermined position, and a washing switch of the dishwasher is then operated. By this means, a washing process is started. After the washing ends, the washing rack of the dishwasher is carried out onto a clean table, and the tableware that was washed is sorted into respective kinds of tableware such as large bowls, plates, and small bowls, which are then stacked on a stock rack. Because it is necessary for a worker to perform these operations during gaps between other work such as cooking food, serving food and clearing tables, not only is it extremely troublesome for the worker to perform the aforementioned dishwashing operations, but it is also necessary for the worker to pay attention to the timing at which the dishwashing operation ends.

SUMMARY OF INVENTION

Technical Problem

A purpose is to provide a dishwashing system that contributes to reducing the labor of a worker and also reduces the troublesomeness of a series of operations relating to dishwashing.

Solution to Problem

According to one aspect of the present invention, there is provided a dishwashing system which comprises: a dishwasher that washes tableware contained in a dishwashing rack, inside a washing chamber; a carry-in stand for placing a dishwashing rack that is to be carried into the washing chamber on; a carry-out stand for placing the dishwashing rack that is carried out from the washing chamber on; and a robot device having a robot arm mechanism. The carry-in stand and the dishwasher are arranged within a movable range of the robot arm mechanism. The robot arm mechanism transfers the dishwashing rack from the carry-in stand to the washing chamber, and also operates the dishwasher.

DETAILED DESCRIPTION

Figure 1:
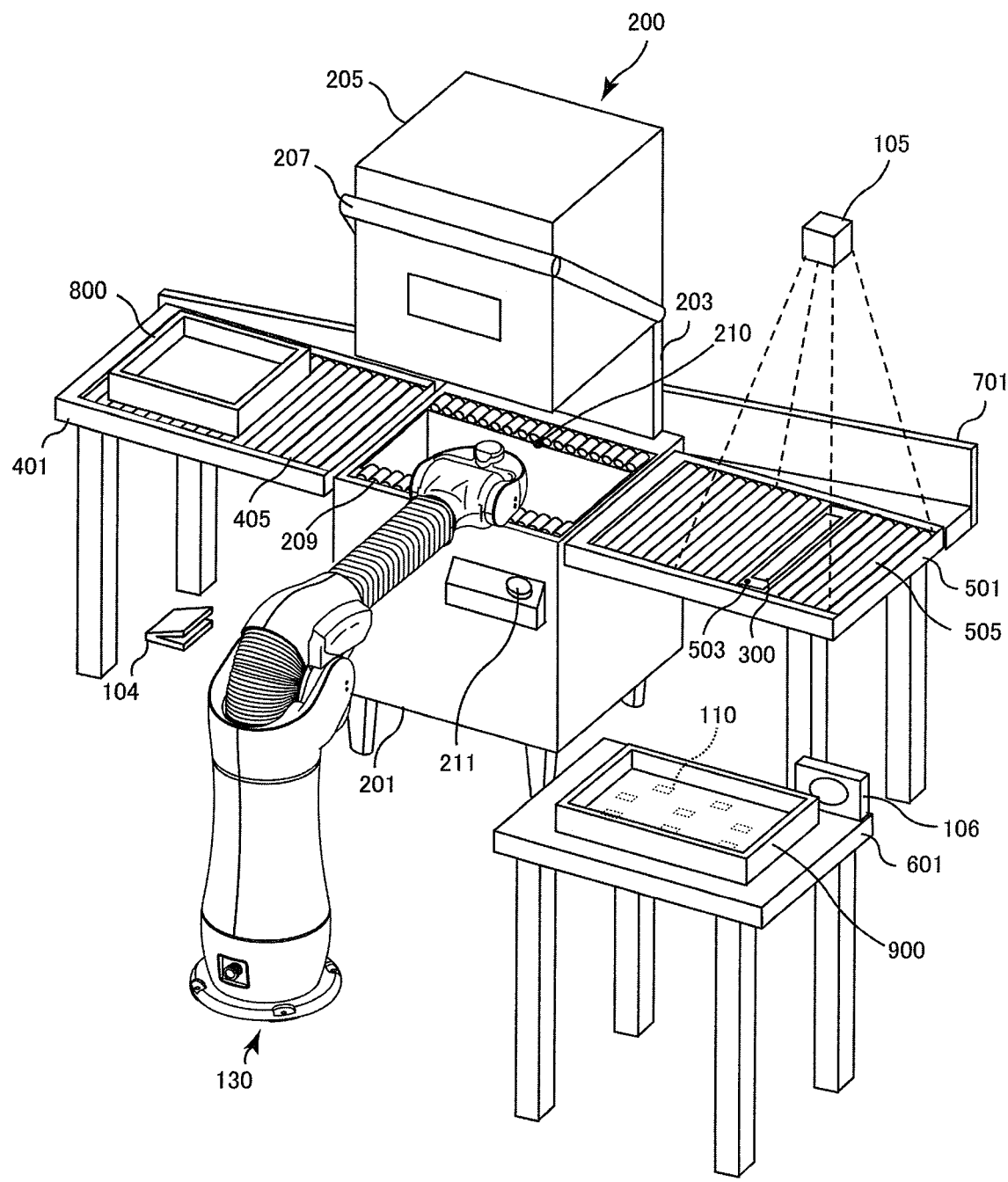
FIG. 1 is an external perspective view of a dishwashing system according to the present embodiment.
Figure 2:
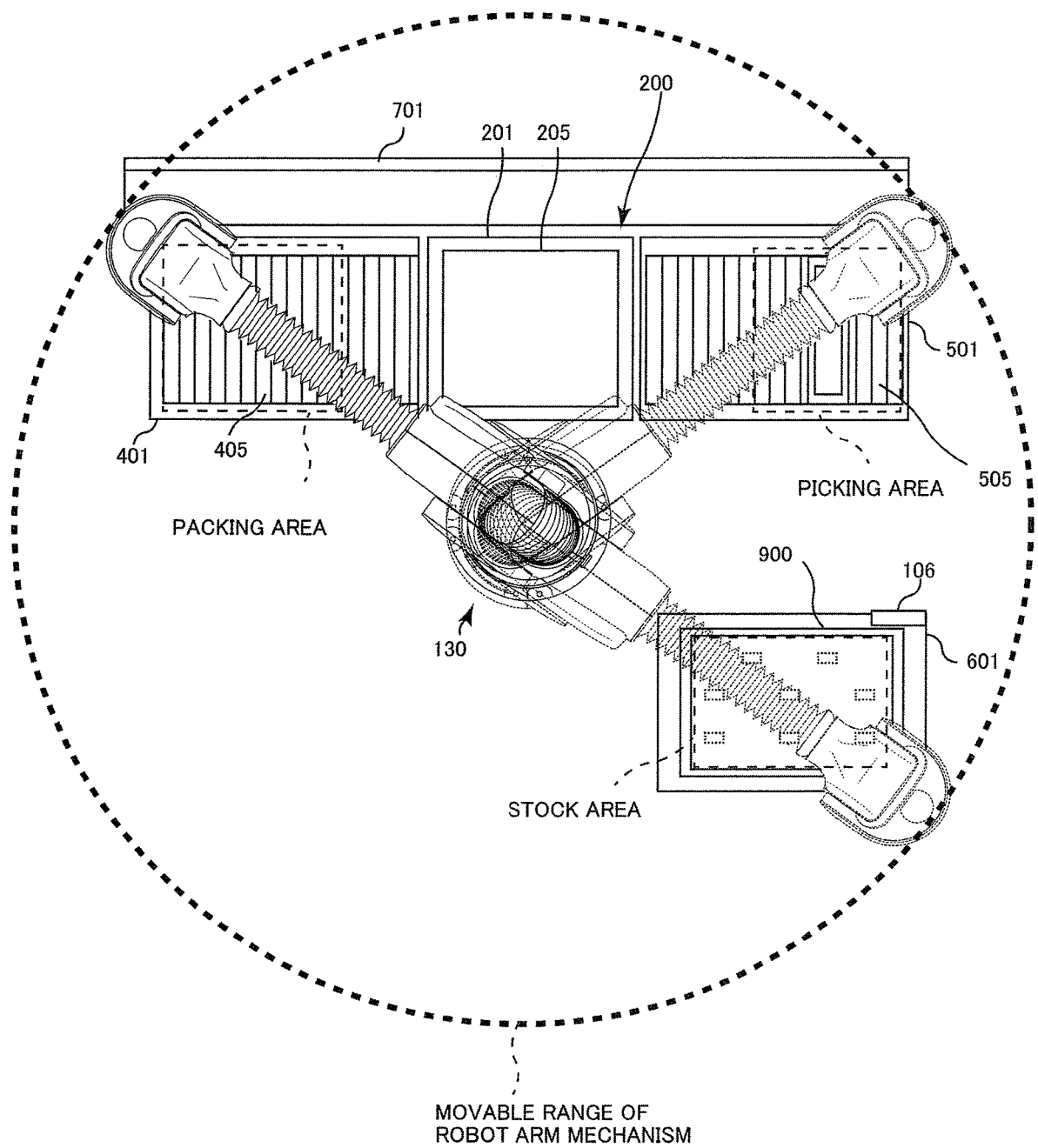
FIG. 2 is a plan view of the dishwashing system in FIG. 1.

FIG. 1 is an external perspective view of a dishwashing system according to the present embodiment. FIG. 2 is a plan view of the dishwashing system in FIG. 1. The dishwashing system according to the present embodiment includes a door-type dishwasher 200 (hereunder, also referred to as simply dishwasher 200), a carry-in stand 401, a carry-out stand 501, a stock stand 601, and a robot device 100.

The dishwasher 200 has a washing machine main body 201. A washing chamber 210 that is opened and closed by means of a door is provided in the washing machine main body 201. Tableware or the like that is contained in a dishwashing rack 800 is washed inside the washing chamber 210. A machine unit is provided downward of the washing machine main body 201. A washing water tank that stores washing water and a washing pump that pumps washing water are housed in the machine unit in order to jet out washing water from a washing nozzle onto tableware. Further, a rinsing water tank and a rinsing pump are also housed in the machine unit in order to jet out rinsing water onto tableware from a rinsing nozzle. An opening is formed in the bottom face of the washing chamber 210, and washing water and rinsing water are jetted out through the opening toward the washing chamber 210 from the machine unit. Slide rails are provided so as to straddle the washing chamber 210. A columnar support 203 is erectly provided at the back face of the washing machine main body 201. A box-type door 205 that is movable upward and downward is supported by the columnar support 203. A handle 207 is arranged on the front face of the door 205. The handle 207 is connected to a link bar. One end of the link bar is pivotally supported by the columnar support 203, and a center portion of the link bar is engaged with a side face of the door 205. When the handle 207 is operated in the upward or downward direction, the door 205 that is engaged with the link bar moves in the upward or downward direction, and by this means the washing chamber 210 is opened or shut. When the door 205 is at the lowermost position, the washing chamber 210 is shut. The start of washing/rinsing operations is triggered when a washing switch 211 of the dishwasher 200 is pressed in a state in which the washing chamber 210 is closed.

Conventionally, a worker has sequentially performed a plurality of operations to wash tableware using the aforementioned dishwasher 200. Operations that a worker has conventionally performed are: a carry-in operation in which the worker carries the dishwashing rack 800 containing tableware that has been placed on the carry-in stand 401 into the washing chamber 210 of the dishwasher 200; a shutting operation in which the worker shuts the washing chamber 210 by closing the door 205 of the dishwasher 200; a pressing operation in which the worker presses the washing switch 211; an opening operation in which the worker opens the door 205 of the dishwasher 200 to open the washing chamber 210; a carry-out operation in which the worker carries out the dishwashing rack 800 from the washing chamber 210 to the carry-out stand 501; and a transfer operation in which the worker transfers tableware from the dishwashing rack 800 on the carry-out stand 501 to a stock rack 900 on the stock stand 601.

The dishwashing system according to the present embodiment reduces the workload of a worker. Most preferably, a robot arm mechanism 130 performs all of the aforementioned operations. The carry-in stand 401 and the dishwasher 200 are arranged within the movable range of the robot arm mechanism 130 so that the robot arm mechanism 130 can carry in the dishwashing rack 800 from the carry-in stand 401 to the washing chamber 210 of the dishwasher 200. The dishwasher 200 is arranged within the movable range of the robot arm mechanism 130 so that the robot arm mechanism 130 can shut the washing chamber by closing the door 205 of the dishwasher 200, press the washing switch 211, and after washing, can open the door 205 of the dishwasher 200 to open the washing chamber 210. The dishwasher 200 and the carry-out stand 501 are arranged within the movable range of the robot arm mechanism 130 so that the robot arm mechanism 130 can carry out the dishwashing rack 800 from the washing chamber 210 to the carry-out stand 501. The carry-out stand 501 and the stock stand 601 are arranged within the movable range of the robot arm mechanism 130 so that the robot arm mechanism 130 can transfer tableware from the dishwashing rack 800 on the carry-out stand 601 to the stock rack 900 on the stock stand 601. By arranging the stands 401, 501 and 601 and the dishwasher 200 within the movable range of the robot arm mechanism 130, the robot device 100 can be caused to perform the entire series of operations or some of the operations. Further, the operations assigned to the robot device 100 can be dynamically changed without changing the installation position of the robot arm mechanism 130.

In this case, the dishwasher 200 is arranged at the front of the robot arm mechanism, with the carry-in stand 401 and the carry-out stand 501 being arranged adjacent to the two sides of the dishwasher 200 so as to sandwich the dishwasher 200 therebetween, and the stock stand 601 is arranged at a position that is on the robot arm mechanism side and is adjacent to the carry-out stand 501. The height of the carry-in stand 401 and the height of the carry-out stand 501 are designed to match the height of the washing chamber 210 so that the dishwashing rack 800 can be moved from the carry-in stand 401 to the washing chamber 210, and from the washing chamber 210 to the carry-out stand 501 merely by sliding the dishwashing rack 800. Further, in order to smoothly move the dishwashing rack 800, a plurality of conveying rollers 405, 505 and 209 are arranged in the carry-in stand 401, the carry-out stand 501, and the slide rails of the washing chamber 210, respectively. A collection rail 701 for collecting the dishwashing rack 800 on the carry-out stand 501 and returning the dishwashing rack 800 to the carry-in stand 401 is installed in an area from the carry-out stand 501 to the carry-in stand 401 on the back face side of the dishwasher 200. The height of the collection rail 701 on the carry-out stand 501 side is the same as the height of the carry-out stand 501, and the collection rail 701 is provided so as to slope gently downward toward the carry-in stand 401. By this means, the dishwashing rack 800 that has been collected in the collection rail 701 is returned to the carry-in stand 401 side by gravity.

The dishwashing rack 800 that is to be carried into the washing chamber 210 of the dishwasher 200 is placed on the carry-in stand 401. A packing area (for example, 400 mm×400 mm) is set on the carry-in stand 401. A worker arranges the dishwashing rack 800 in the packing area. The worker packs tableware in the dishwashing rack 800 that is arranged in the packing area.

A mark or the like for allowing workers to recognize the packing area of the robot arm mechanism 130 is attached at a region corresponding to the packing area of the carry-in stand 401. In the present embodiment, the position of the dishwashing rack 800 that is placed on the carry-in stand 401 is not detected by a sensor or camera or the like. The robot arm mechanism carries in the dishwashing rack 800 from the carry-in stand 401 to the washing chamber 210 of the dishwasher 200 in accordance with a predetermined trajectory. Therefore, providing a mark on the carry-in stand 401 and placing the dishwashing rack 800 in accordance with the mark allows the robot arm mechanism to successfully perform a carry-in operation. A foot switch 104 that constitutes a part of the robot device 100 is arranged on the floor surface below the carry-in stand 401. When the foot switch 104 is stepped on, washing preparation operations, described later, are started by the robot arm mechanism 130.

The dishwashing rack 800 that is carried out from the washing chamber 210 of the dishwasher 200 is placed on the carry-out stand 501. A picking area (for example, 400 mm×400 mm) of the robot arm mechanism 130 is set in the carry-out stand 501. A picking area camera 105 is installed above the picking area in a manner so that the field of view of the picking area camera 105 includes the picking area. The robot device 100 subjects an image of inside the picking area that is photographed by the picking area camera 105 to image processing by means of an image processing section 127, described later, and thereby recognizes tableware within the picking area, and the robot arm mechanism 130 sequentially picks up tableware within the picking area in accordance with control of an operation control section 123 that is described later. A hollow 503 having a rectangular shape that is parallel with the width direction is formed at the center of the picking area of the carry-out stand 501. A stand-up mechanism is housed in the hollow 503. The stand-up mechanism has a prism-shaped stand 300 and a stand drive section 301 that drives the stand 300. One end of the stand 300 is pivotally supported by a side wall on the collection rail 701 side of hollow 503. The stand 300 has an axis of rotation that is orthogonal to the length direction (direction in which the dishwashing rack 800 is carried out) and height direction of the carry-out stand 501. In a state in which the stand 300 is not being driven, the surface thereof is at a lower position than the position of the surface of the carry-out stand 501. When the stand drive section 301 drives, the stand 300 rotates around the axis of rotation of one end thereof, and the other end side thereof is pushed upward. Thus, the dishwashing rack 800 on the picking area is pushed upward, and is collected by the collection rail 701 from the carry-out stand 501 in an upright state in which the surface of the dishwashing rack 800 is perpendicular to the surface of the carry-out stand 501.

The stock rack 900 for containing tableware that was washed by the dishwasher 200 is placed on the stock stand 601. A stock area of the robot arm mechanism 130 is set on the inside of the stock rack 900. Release positions are predefined at a plurality of locations, in this example, eight locations, within the stock area. A piece of tableware that is picked up by the robot arm mechanism 130 in the picking area is released at a release position in the stock area. A reflection-type photoelectric sensor (tableware sensors) 110 constituting part of the robot device 100 is mounted at each release position. The tableware sensor 110 indicates an "on" state when tableware is present at the corresponding release position, and indicates an "off" state when tableware is not present at the release position. A lamp is installed as a notification section 106 that constitutes part of the robot device 100 in the stock stand 601. Lighting of the lamp is triggered when the number of tableware pieces stacked at the release positions reaches a predetermined number. When a worker sees the lamp that is lit, the worker can recognize that the number of tableware pieces in the stock rack 900 has reached a predetermined number. Note that, although in this example light is used as means for notifying a worker, sound or vibration or the like may be used as notifying means as long as a worker can recognize the notification. When the number of stacked tableware pieces present at least at one position among release positions PR1 to PR8, described later, reaches a predetermined upper limit number, such as six pieces, in accordance with control of a system control section 121, the notification section 106 notifies a worker to that effect by means of at least one of light, sound and vibration, and preferably by means of light, sound and vibration. Note that, with regard to a vibrational notification, such a notification is performed by transmitting a trigger signal for actuating a vibrator function from the notification section 106 by means of, typically, radio communication to a portable terminal having the vibrator function which a worker carries on their person.

Figure 3:
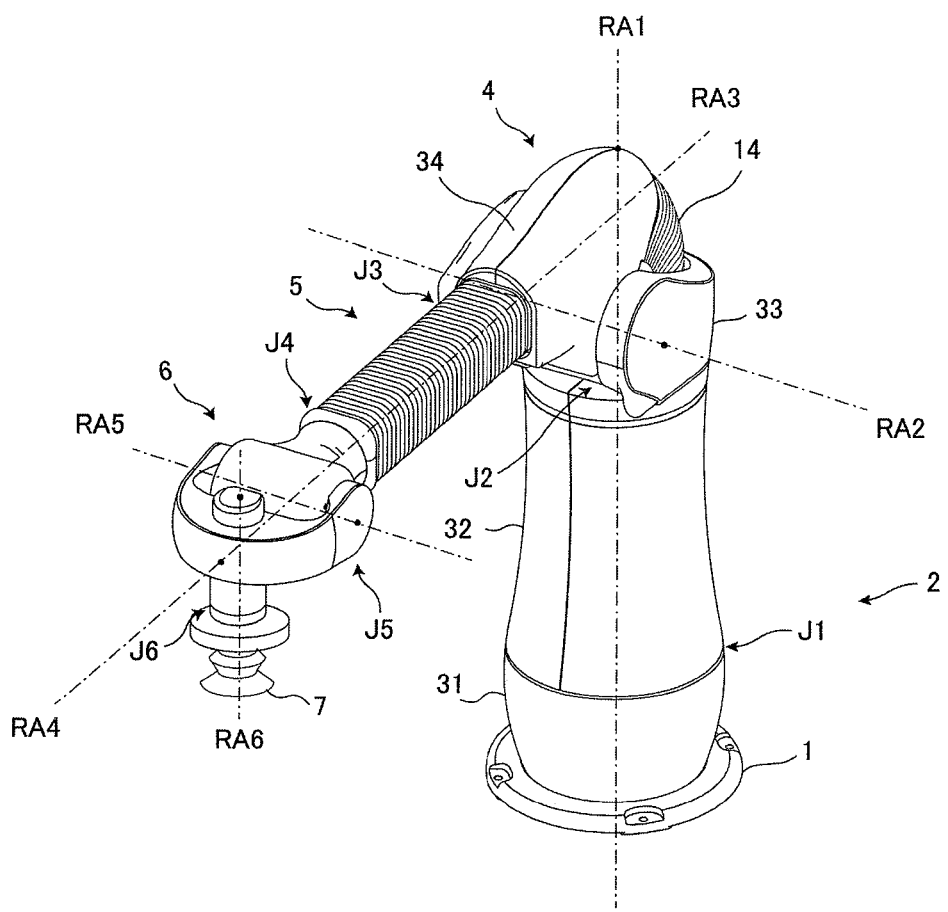
FIG. 3 is an external perspective view of a robot arm mechanism in FIG. 1.
Figure 4:
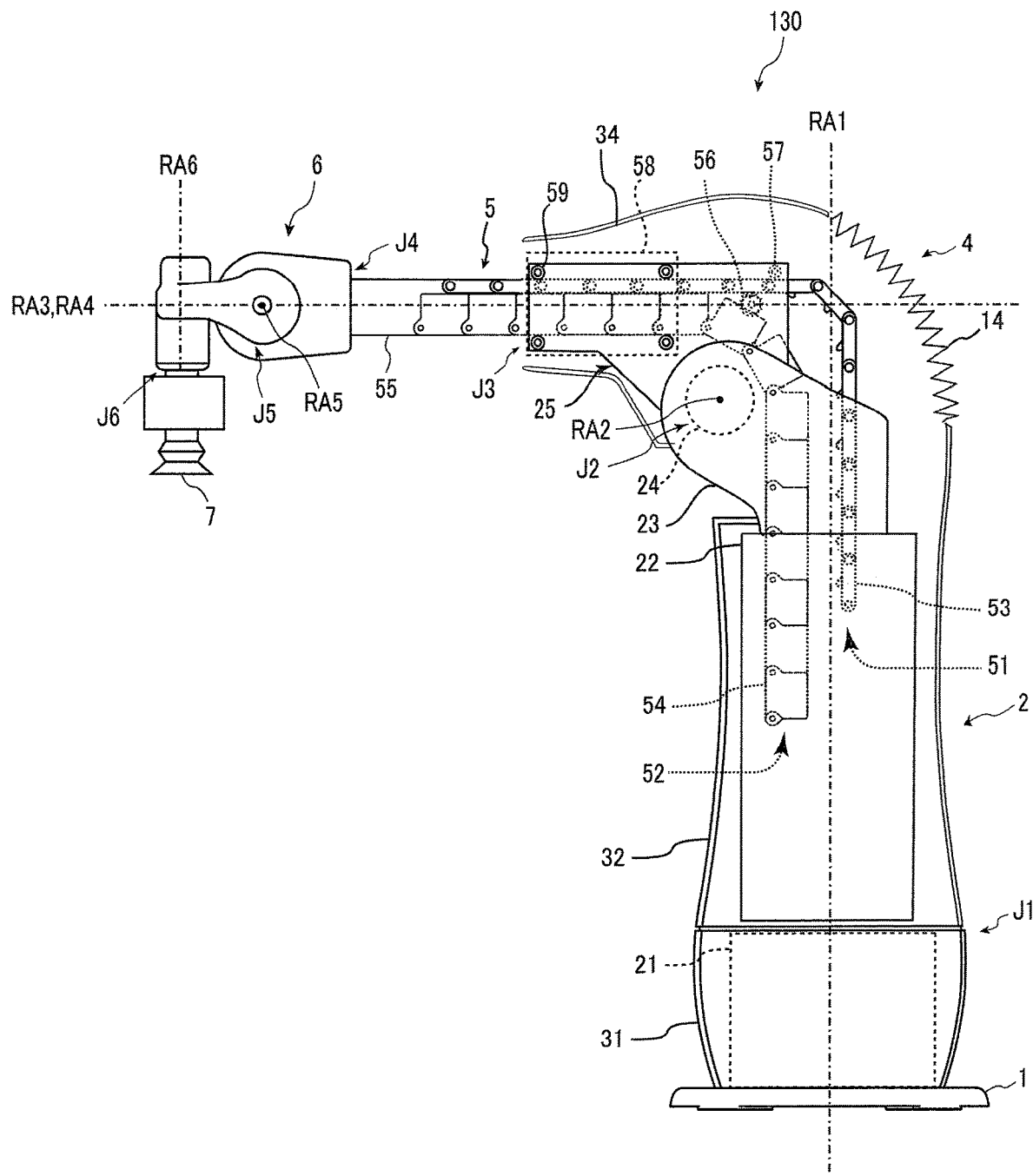
FIG. 4 is a side view illustrating an internal structure of a robot arm mechanism in FIG. 1.

FIG. 3 is an external perspective view of the robot arm mechanism 130 in FIG. 1. FIG. 4 is a side view illustrating the internal structure of the robot arm mechanism 130 in FIG. 1. The robot arm mechanism 130 of the robot device 100 according to the present embodiment has a plurality of joints J1 to J6. The robot arm mechanism 130 is a polar coordinates-type mechanism in which a turning rotational joint, an upward/downward rotational joint and a linear motion joint are arranged in that order from a base. In this example, a linear extension and retraction mechanism, described later, that has a long extension length is adopted as the linear motion joint, although the present invention is not limited thereto.

The robot arm mechanism 130 includes a base 1, a columnar support section 2, an up/down section 4, an arm section 5 and a wrist section 6. The columnar support section 2, the up/down section 4, the arm section 5 and the wrist section 6 are arranged in that order from the base 1. A plurality of joints J1, J2, J3, J4, J5 and J6 are arranged in that order from the base 1. The columnar support section 2 forming a cylindrical body is installed, typically, vertically on the base 1. The columnar support section 2 houses a first joint J1 as a turning rotational joint. The first joint J1 has an axis of rotation RA1. The axis of rotation RA1 is parallel to a vertical direction. The columnar support section 2 has a columnar support lower frame 21 and a columnar support upper frame 22. One end of the lower frame 21 is connected to a fixed section of the first joint J1. The other end of the lower frame 21 is connected to the base 1. The lower frame 21 is covered by a cylindrical housing 31. The upper frame 22 is connected to a rotating section of the first joint J1, and axially rotates on the axis of rotation RA1. The upper frame 22 is covered by a cylindrical housing 32. The upper frame 22 rotates with respect to the lower frame 21 accompanying rotation of the first joint J1, and by this means the arm section 5 turn horizontally. First and second piece strings 51 and 52 of a third joint J3 as a linear extension and retraction mechanism described later are housed in an inner hollow of the columnar support section 2 that forms a cylindrical body.

The up/down section 4 that includes a second joint J2 is arranged at an upper part of the columnar support section 2. The second joint J2 is a rotational joint. An axis of rotation RA2 of the second joint J2 is perpendicular to the axis of rotation RA1. The up/down section 4 has a pair of side frames 23 as a fixed section (support section) of the second joint J2. The pair of side frames 23 is connected to the upper frame 22. The pair of side frames 23 are covered by a saddle-shaped cover 33. A cylindrical body 24 as a rotating section of the second joint J2 that also serves as a motor housing is supported by the pair of side frames 23. A sending-out mechanism 25 is mounted on the peripheral surface of the cylindrical body 24. A drive gear 56, a guide roller 57 and a roller unit 58 are supported by a frame 26 of the sending-out mechanism 25. The sending-out mechanism 25 rotates accompanying axial rotation of the cylindrical body 24, and the arm section 5 that is supported by the sending-out mechanism 25 rotates in the upward and downward direction. The sending-out mechanism 25 is covered by a cylindrical cover 34. A gap between the saddle-shaped cover 33 and the cylindrical cover 34 is covered by a bellows cover 14 that has a cross-sectional U shape. The bellows cover 14 expands and contracts so as to follow upward and downward rotation of the second joint J2.

The third joint J3 is provided by a linear extension and retraction mechanism. The linear extension and retraction mechanism is equipped with a structure that was newly developed by the present inventors, and is clearly distinguished from a so-called conventional linear motion joint from the viewpoint of the movable range thereof. Although the arm section 5 of the third joint J3 is bendable, the bending is restricted when the arm section 5 is sent out in the forward direction from the sending-out mechanism 25 that is a root of the arm section 5 along a center axis (extension and contraction center axis RA3), and linear rigidity is secured. Bending of the arm section 5 is restored when the arm section 5 is pulled back in the rearward direction. The arm section 5 has the first piece string 51 and the second piece string 52. The first piece string 51 includes a plurality of first pieces 53 that are bendably connected. The first pieces 53 are formed in a substantially flat plate shape. The first pieces 53 are bendably connected at hinge sections at end parts thereof. The second piece string 52 includes a plurality of second pieces 54. Each second piece 54 is formed in the shape of a groove-like body having an inverted C-shape in transverse section or as a hollow square-shaped cylindrical body. The second pieces 54 are bendably connected at hinge sections at an end part of a bottom plate thereof. Bending of the second piece string 52 is restricted at positions at which end faces of side plates of the second pieces 54 butt against each other. At such positions, the second piece string 52 is linearly arranged. A leading first piece 53 of the first piece string 51 and a leading second piece 54 of the second piece string 52 are connected by a head piece 55. For example, the head piece 55 has a shape that integrates the second piece 54 and the first piece 53.

The first and second piece strings 51 and 52 are pressed together and joined to each other when passing through the roller unit 58. As a result of being joined to each other, the first and second piece strings 51 and 52 exhibit linear rigidity and thereby constitute the columnar arm section 5. The drive gear 56 is arranged together with the guide roller 57 at the rear of the roller unit 58. The drive gear 56 is connected to an unshown motor unit. The motor unit generates motive power for rotating the drive gear 56. A linear gear 539 is formed along the connecting direction at the width center of a face on the inner side of the first piece 53, that is, a face on the side on which the first piece 53 joins with the second piece 54. The linear gears 539 which are adjacent when a plurality of the first pieces 53 are linearly aligned are connected linearly to constitute a long linear gear. The drive gear 56 is meshed with the linear gear 539 of the first piece 53 that is pressed by the guide roller 57. The linear gears 539 that are connected linearly constitute a rack-and-pinion mechanism together with the drive gear 56. When the drive gear 56 rotates forward, the first and second piece strings 51 and 52 are sent out in the forward direction from the roller unit 58. When the drive gear 56 rotates backward, the first and second piece strings 51 and 52 are pulled back to the rear of the roller unit 58. The first and second piece strings 51 and 52 that were pulled back are separated from each other between the roller unit 58 and the drive gear 56. The separated first and second piece strings 51 and 52 each return to a bendable state. The first and second piece strings 51 and 52 that returned to a bendable state both bend in the same direction (inward) and are vertically housed inside the columnar support section 2. At this time, the first piece string 51 is housed in a substantially aligned state approximately parallel to the second piece string 52.

The wrist section 6 is attached to the tip of the arm section 5. A suction pad 7 for attaching by suction to tableware is attached to the tip of the wrist section 6. The wrist section 6 includes fourth to sixth joints J4 to J6. The fourth to sixth joints J4 to J6 have three axes of rotation RA4 to RA6, respectively, that are orthogonal. The fourth joint J4 is a rotational joint that rotates on the fourth axis of rotation RA4 that approximately matches an extension and contraction center axis RA3. The suction pad 7 is oscillatingly rotated by rotation of the fourth joint J4. The fifth joint J5 is a rotational joint that rotates on the fifth axis of rotation RA5 perpendicular to the fourth axis of rotation RA4. The suction pad 7 is tilted and rotated to front and rear by rotation of the fifth joint J5. The sixth joint J6 is a rotational joint that rotates on the sixth axis of rotation RA6 perpendicular to the fourth axis of rotation RA4 and the fifth axis of rotation RA5. The suction pad 7 is axially rotated by rotation of the sixth joint J6.

The suction pad 7 is, for example, a bellows tube made of silicon resin that has a tip which expands in a cone shape. An air compressor is connected through an air tube to the suction pad 7. When the air compressor drives in a state in which the tip of the suction pad 7 has been brought into contact with the rear face of a piece of tableware, the piece of tableware is attached by suction to the suction pad 7 by means of a negative pressure inside the suction pad 7 that forms a closed space with the piece of tableware. When the air compressor stops, the inside of the suction pad 7 returns to atmospheric pressure and the piece of tableware is released. Further, in order to perform an operation to move the dishwashing rack 800 and to operate the handle of the dishwasher 200 using the suction pad 7, for example, a rear end portion of the suction pad 7 is thicker than a tip portion of the suction pad 7. By this means, in a state in which the rear end portion of the suction pad 7 pushes against the dishwashing rack 800, the suction pad 7 can be moved so as to push out the dishwashing rack 800 while avoiding the occurrence of a situation in which the tip of the suction pad 7 comes in contact with the dishwashing rack 800. Similarly, the washing chamber 210 can be shut by causing the suction pad 7 to move downward in a state in which the rear end portion of the suction pad 7 pushes against the top surface of the handle 207 of the dishwasher 200, and the washing chamber 210 can be opened by causing the suction pad 7 to move upward in a state in which the rear end portion of the suction pad 7 pushes against the bottom surface of the handle 207.

Figure 5:
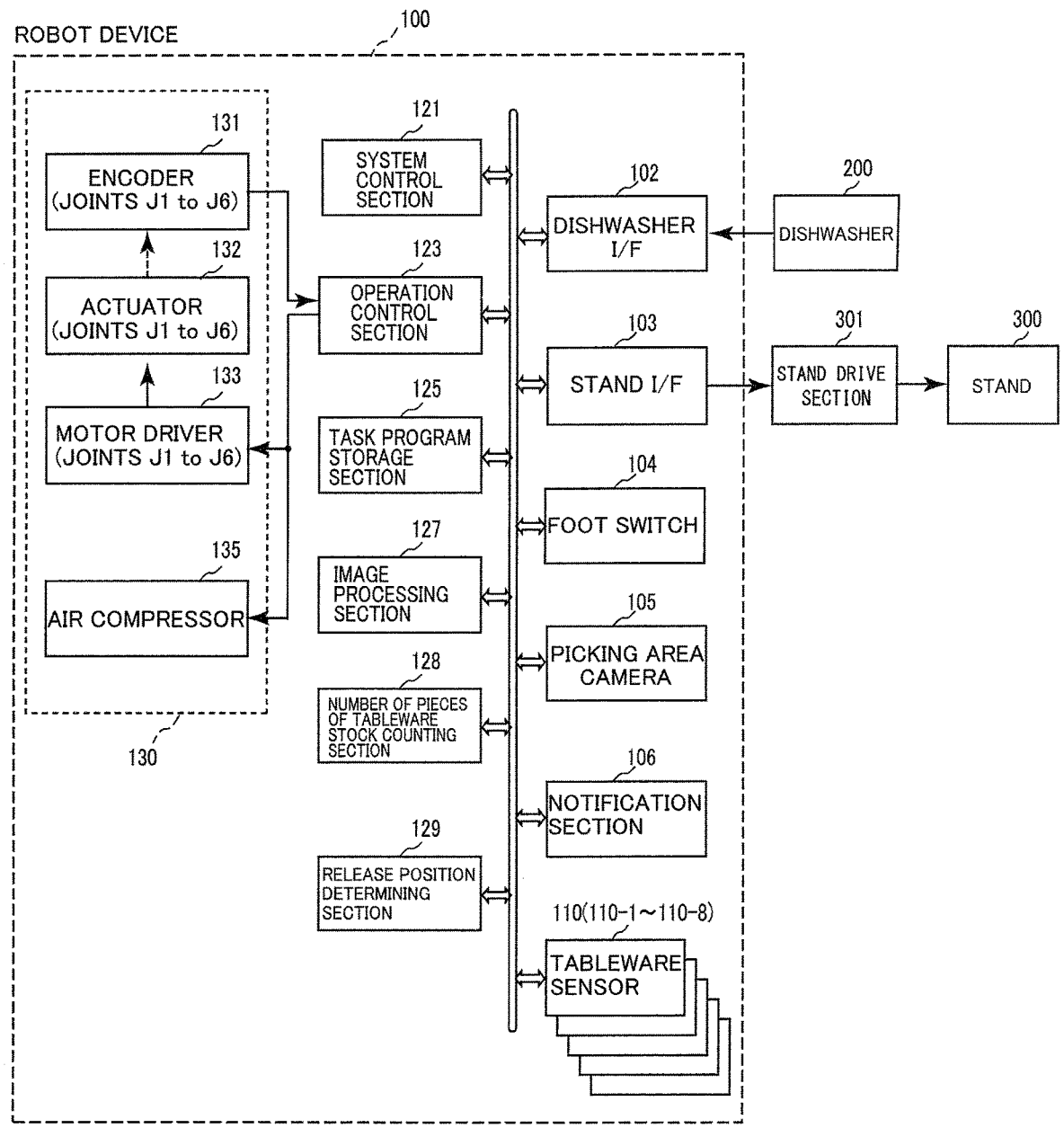
FIG. 5 is a block diagram illustrating a configuration of the dishwashing system according to the present embodiment.

FIG. 5 is a block diagram illustrating a configuration of the dishwashing system according to the present embodiment. The dishwashing system has the dishwasher 200 and the robot device 100. The dishwasher 200 performs operations to wash tableware in accordance with a washing program that is registered in advance, that are triggered when the washing switch 211 is pressed. Upon the completion of the tableware washing operations, the dishwasher 200 outputs a washing completion signal to the robot device. The dishwasher 200 is electrically connected through a dishwasher interface (dishwasher I/F) 102 to the robot device 100, and the stand drive section 301 is electrically connected through a stand interface (stand I/F) 103 to the robot device 100. The robot device 100 receives the washing completion signal that is output from the dishwasher 200 through the dishwasher I/F 102 (reception section). The robot device 100 outputs a picking completion signal and a tableware storing operations completion signal to the stand drive section 301 through the stand I/F 103. When the stand drive section 301 receives both the picking completion signal and the tableware storing operations completion signal, the reception of these signals serves as a trigger for the stand drive section 301 to drive, and by this means the stand 300 rotates and the dishwashing rack 800 is collected in the collection rail 701.

The robot device 100 includes: the robot arm mechanism 130; the foot switch 104 that serves as a trigger for washing operations performed by the robot arm mechanism 130; a picking area camera that photographs the picking area of the robot arm mechanism 130; the notification section 106 for notifying a worker that a predetermined number of tableware pieces have been stacked at the release positions by the robot arm mechanism 130; and a tableware sensors 110 that detects the existence or non-existence of tableware at release positions of the robot arm mechanism 130. As an actuator 132, for example, a stepping motor is provided in each of the joints J1, J2, J3, J4, J5 and J6 of the robot arm mechanism 130. These stepping motors are electrically connected to a motor driver 133, respectively. Each motor driver 133 supplies a pulse in accordance with a received position command value to the corresponding stepping motor. The drive shaft of each stepping motor is connected to a rotary encoder 131, respectively. The respective rotary encoders 131 are used for measuring a rotational position of the corresponding drive shaft by using a counter to add or subtract a pulse that is output at each constant rotation angle. A compressor 135 is connected through an air tube to the suction pad 7 of the robot arm mechanism 130.

The robot device 100 includes the system control section 121, a task program storage section 125, the image processing section 127, a stock tableware piece counting section 128, a release position determining section 129 and the operation control section 123. The system control section 121 has a CPU (central processing unit) and a semiconductor memory and the like, and performs unified control of the robot device 100.

The task program storage section 125 stores data of programs for a plurality of different kinds of operations, in this example, data of first and second task programs. An end trajectory and the like are described in the task programs. Operations that relate to the washing preparation operations are described in the first task program. The washing preparation operations consist of a carry-in operation in which the robot arm mechanism 130 carries the dishwashing rack 800 into the washing chamber 210 of the dishwasher 200 from the packing area of the carry-in stand 401, a shutting operation in which the robot arm mechanism 130 operates the handle 207 of the dishwasher 200 to shut the washing chamber 210, and a pressing operation in which the robot arm mechanism 130 presses the washing switch 211 of the dishwasher 200. Note that, in the case of the dishwasher 200 of a type in which washing is automatically started upon the washing chamber 210 being shut, the operation of pressing the washing switch 211 is omitted. Because the washing preparation operations do not include any operations with respect to tableware that is packed inside the dishwashing rack 800, the robot arm mechanism 130 operates according to a predetermined end trajectory. When the foot switch 104 is pressed downward, the first task program is read out from the task program storage section 125 and loaded by the system control section 121. The operation control section 123 outputs position command signals to the respective motor drivers 133 of the robot arm mechanism 130 in accordance with an end trajectory that is defined in advance in the first task program.

Operations that relate to relating to tableware storing operations are described in the second task program. The tableware storing operations consist of: an opening operation in which the robot arm mechanism 130 operates the handle 207 to open the washing chamber 210; a carry-out operation in which the robot arm mechanism 130 carries out the dishwashing rack 800 from the washing chamber 210 of the dishwasher 200 and places the dishwashing rack 800 in the picking area of the carry-out stand 501; and a picking operation in which the robot arm mechanism 130 picks up tableware that is packed in the dishwashing rack 800, and releases the tableware inside the stock rack 900 of the stock stand 601. In the tableware storing operations, a pick-up position and a release position in the picking operation vary depending on the kind, location and orientation of the tableware in the dishwashing rack 800 as well as the number of tableware pieces that are stacked at the release positions in the stock rack 900. When the washing completion signal is received, the second task program is read out from the task program storage section 125 and loaded by the system control section 121. The operation control section 123 outputs position command signals to the respective motor drivers 133 of the robot arm mechanism 130 in accordance with an end trajectory that is defined in advance in the second task program. With regard to the picking operation, the operation control section 123 calculates an end trajectory of the robot arm mechanism 130 in accordance with a pick-up position calculated by the image processing section 127 that is described later, a number of releases for each release position (number of tableware pieces which are stacked at each release position) that are counted by the stock tableware piece counting section 128, and a release position that is determined by the release position determining section 129, and outputs position command signals to the respective motor drivers of the robot arm mechanism 130. Specifically, the operation control section 123 calculates a trajectory of the suction pad 7 based on a pick-up position for each piece of tableware that was calculated by the image processing section 127, a release position determined by the release position determining section 129, and a release height that is determined based on the number of tableware pieces which are stacked and the tableware height that is specific to the kind of tableware at the relevant release position, and outputs position command signals to the respective motor drivers of the robot arm mechanism 130.

Note that, in this case, output of a washing completion signal by the dishwasher 200 is triggered by the completion of washing of tableware, and the robot arm mechanism 130 receives the washing completion signal and starts the tableware storing operations. However, a method by which the robot arm mechanism 130 recognizes that washing operations by the dishwasher 200 are completed is not limited thereto. For example, the dishwasher 200 may be of a type that generates a sound (washing completion sound) that indicates the completion of washing operations, with generation of the sound being triggered by completion of the washing operations. In this case, the robot device is equipped with a microphone and an audio processing section, and the audio processing section processes sounds that are picked up by the microphone and recognizes the washing completion sound. By this means, the robot arm mechanism 130 can take the generation of a washing completion sound as a trigger to start tableware storing operations. The dishwasher 200 may also be of a type that includes a monitor and that displays an image (washing completion image) indicating the completion of washing operations, with display of the image being triggered by completion of the washing operations. In this case, the robot device includes a monitor camera that photographs the monitor of the dishwasher 200, and a monitor image photographed by the monitor camera is processed by the image processing section 127 of the dishwasher 200, and the image processing section 127 determines whether or not the washing completion image is displayed. By this means, the robot arm mechanism 130 can take the display of a washing completion image as a trigger to start tableware storing operations. Thus, by providing the robot device 100 with means for ascertaining by sound or light that washing of tableware by the dishwasher is completed, even a dishwasher of a type that cannot exchange signals with an external device can be used as the dishwasher 200 of the dishwashing system according to the present embodiment.

Figure 6A:
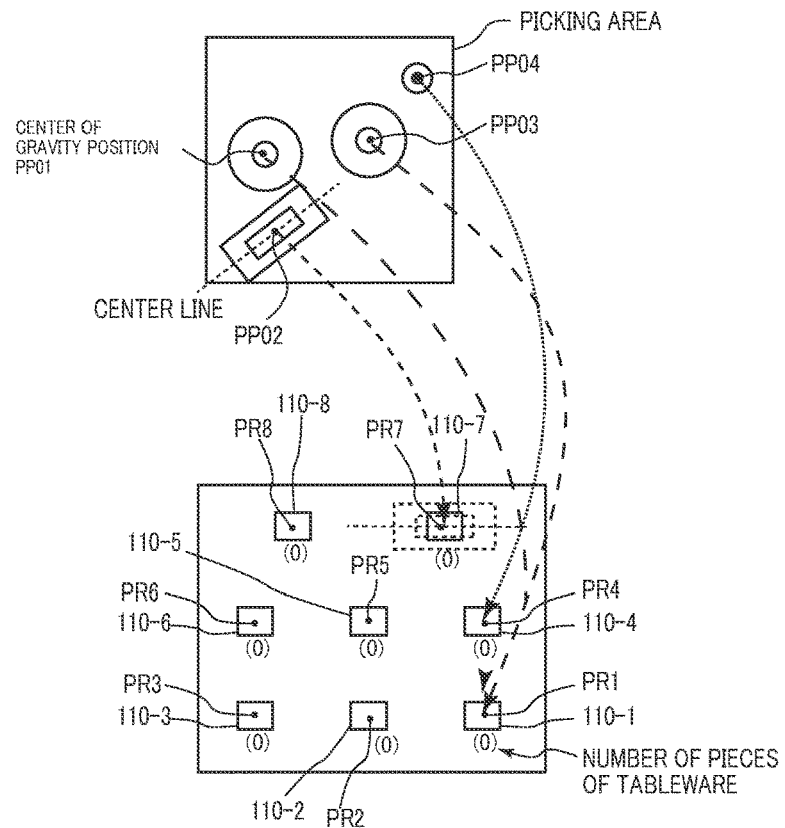
FIGS. 6A and 6B are supplementary diagrams for describing processing relating to a picking operation by the robot arm mechanism in FIG. 5.
Figure 6B:
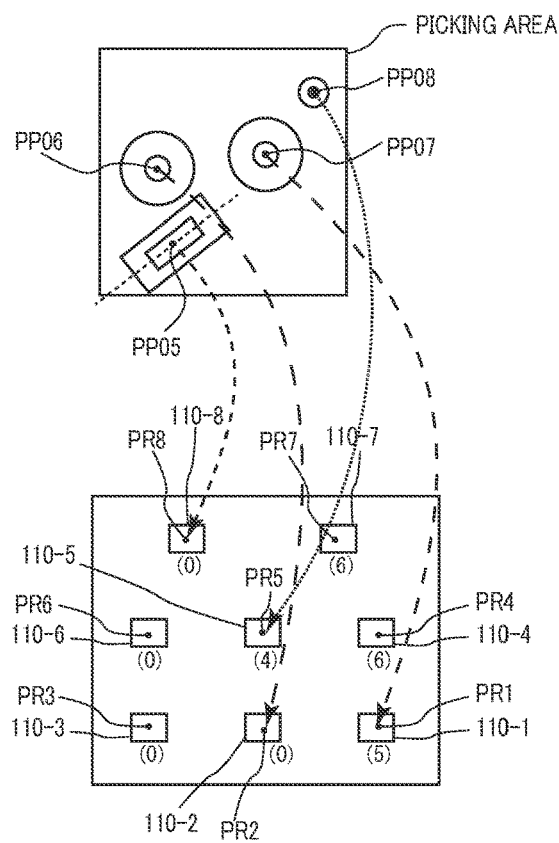

FIGS. 6A and 6B are supplementary diagrams for describing a picking operation by the robot arm mechanism 130 in FIG. 5. FIG. 6A illustrates a case where the number of tableware pieces at each of the release positions is zero. FIG. 6B illustrates a case where the number of tableware pieces at release positions having a high priority level is not zero.

The image processing section 127 determines whether or not tableware is present in the picking area based on an image (picking area image) photographed by the picking area camera 105, and if it is determined that there is tableware in the picking area, the image processing section 127 identifies the kind of tableware, the center of gravity position of the tableware, and the orientation of the tableware. Specifically, a pattern is registered in advance for each kind of tableware (large bowl, plate, small bowl). The image processing section 127 subjects the picking area image to binarization processing, extracts contours of tableware from the binarized picking area image, executes pattern matching processing, and determines whether or not tableware is present in the picking area, and if tableware is present, determines the kind of tableware that is present. The image processing section 127 calculates center of gravity positions (pick-up positions) PP01 to PP04 of the contours of the tableware extracted from the picking area image. The center of gravity positions PP01 to PP04 are represented with a robot coordinate system, and are used as the pick-up positions for the tableware in question by the robot arm mechanism 130. In addition, the image processing section 127 calculates an angle of inclination for a determined plate with respect to a reference line that is defined at the release position. Specifically, as shown in FIG. 6A, the image processing section 127 specifies a center line in the longitudinal direction of a plate in the picking area, and as the angle of inclination, calculates the angle by which the center line of the plate in the picking area is inclined relative to the center line in the longitudinal direction of the plate that is defined at the release position. By identifying the orientation of the plate in the picking area, the orientations of the respective tableware pieces can be aligned when the tableware pieces are released by the robot arm mechanism 130, and by this means the tableware can be stored in a stacked manner. When a specific pattern is not abstracted from the picking area image, that is, when there is no tableware in the picking area, in accordance with control of the system control section 121, the image processing section 127 outputs a picking completion signal indicating the completion of the picking operation by the robot arm mechanism 130 to the stand drive section 301.

The stock tableware piece counting section 128 counts the number of releases for each release position defined in the stock area based on output of the release position determining section 129, and holds a count value for each release position. Tableware sensors 110-1 to 110-8 are installed at positions corresponding to the release positions PR1 to PR8 of the robot arm mechanism 130, respectively. The respective tableware sensors 110-1 to 110-8 indicate an off state when tableware is not present at the release position corresponding thereto among the release positions PR1 to PR8, and indicate an on state when tableware is present. When tableware in the stock rack 900 is moved by a worker, the state of the tableware sensor corresponding to the position at which the relevant tableware had been stacked transitions from an on state to an off state. The stock tableware piece counting section 128 resets the count value for the release position corresponding to the tableware sensor that transitioned from an on state to an off state to zero. Note that, although an example is described here in which the count value for the number of tableware pieces at the relevant release position is reset to zero by taking as a trigger the fact that the corresponding photoelectric sensor among the photoelectric sensors (tableware sensors) 110-1 to 110-8 indicates an off state, the present invention is not limited thereto. For example, a configuration may be adopted in which a stock area camera that photographs the stock area is installed separately from the picking area camera 105, and an image of the stock area photographed by the stock area camera is processed by the image processing section 127, and when a contour of a piece of tableware cannot be extracted at a given release position, the count of the number of tableware pieces for the release position is question is reset to zero. Further, a configuration may be adopted in which a worker operation section consisting of a touch panel or a display is installed at a stock stand 601 or the vicinity thereof, and when a worker moves stocked tableware to a tableware storage rack, the worker performs an operation on the touch panel to tap an icon representing whichever of the release positions the tableware in question had been placed at, to thereby reset the count value for the number of tableware pieces for the release position in question to zero.

The release position determining section 129 determines the release position for the tableware that was picked up the robot arm mechanism 130, based on the number of releases for each of the release positions PR1 to PR8 and the kind and number of tableware pieces in the stock area. Specifically, the release position determining section 129 determines the release position for tableware in the picking area in the following manner. Note that, as shown in FIGS. 6A and 6B, here, among the release positions PR1 to PR8, three release positions PR1 to PR3 in a horizontal row that are furthest from the picking area are set as release positions for large bowls, three release positions PR4 to PR6 in a horizontal row that are further to the picking area side relative to the release positions for large bowls are set as release positions for small bowls, and the remaining two release positions PR7 and PR8 are set as release positions for plates. Further, an order of priority is set for the three release positions PR1 to PR3 for large bowls, the three release positions PR4 to PR6 for small bowls, and the two release positions PR7 and PR8 for plates, respectively. For example, for the plurality of release positions for each kind of tableware, the order of priority is set in the order of distance from the installation position of the robot arm mechanism 130. In this case, for the three release positions PR1 to PR3 for large bowls, the order of priority is assigned in the order of release positions PR1, PR2 and PR3. Similarly, for the three release positions PR4 to PR6 for small bowls, the order of priority is assigned in the order of release positions PR4, PR5 and PR6. For the two release positions PR7 and PR8 for plates, the order of priority is assigned in the order of release positions PR7 and PR8. In addition, an upper limit value of the number of tableware pieces to be stacked, that is, an upper limit number of the number of releases, is set for each release position. The upper limit number of the number of releases is, for example, set to 6.

The release position determining section 129 determines the release positions that correspond to the kinds of tableware that were determined by the image processing section 127 from among the plurality of release positions PR1 to PR8. From among the release positions corresponding to the respective kinds of tableware, the release position determining section 129 extracts release positions for which the number of releases for the respective release positions that is being held by the stock tableware piece counting section 128 has not reached the maximum value. The release position determining section 129 then selects the release position which has the highest order of priority among the extracted release positions. For example, as shown in FIG. 6A, the release position determining section 129 determines the release position PR1 as the release position with respect to the center of gravity positions PP01 and PP03 which are determined to be center of gravity positions of large bowls, determines the release position PR4 as the release position with respect to the center of gravity position PP04 that is determined to be the center of gravity position of a small bowl, and determines the release position PR7 as the release position with respect to the center of gravity position PP02 that is determined to be the center of gravity position of a plate. Further, as shown in FIG. 6B, because the number of releases for the release position PR1 which has the highest priority among the release positions PR1 to PR3 for large bowls is 5, the release position determining section 129 determines the release position PR1 as the release position for a center of gravity position PP06 that was determined as being a large bowl. Consequently, because the number of releases for the release position PR1 will thereby reach the upper limit, the release position determining section 107 moves the release position for a large bowl having a center of gravity position PP07 to the release position PR2 that is second in the order of priority. Similarly, because the number of releases for the release position PR4 having the highest priority among the release positions PR4 to PR6 for small bowls has reached the upper limit, the release position PR5 is determined as the release position for a small bowl having a center of gravity position PP08. Similarly, because the number of releases for the release position PR7 having the highest priority among the release positions PR7 and PR8 for plates has reached the upper limit, the release position PR8 is determined as the release position for a plate (PP05).

The operation control section 123 determines the sequential order for picking the tableware using information relating to the respective kinds, center of gravity positions and postures of a plurality of tableware pieces within the picking area that are identified by the image processing section 108. For example, it will be assumed here that large bowls with the objects to be picked up with highest priority, small bowls are second in the order of priority, and plates are last in the order of priority. Among tableware of the same kind, picking of the tableware is performed in the order of proximity to the columnar support section 2 of the robot arm mechanism 130. Further, a configuration may be adopted in which the operation control section 123 determines the order for picking the tableware so that the picking operation becomes as short as possible, irrespective of the kinds of tableware.

Figure 7:
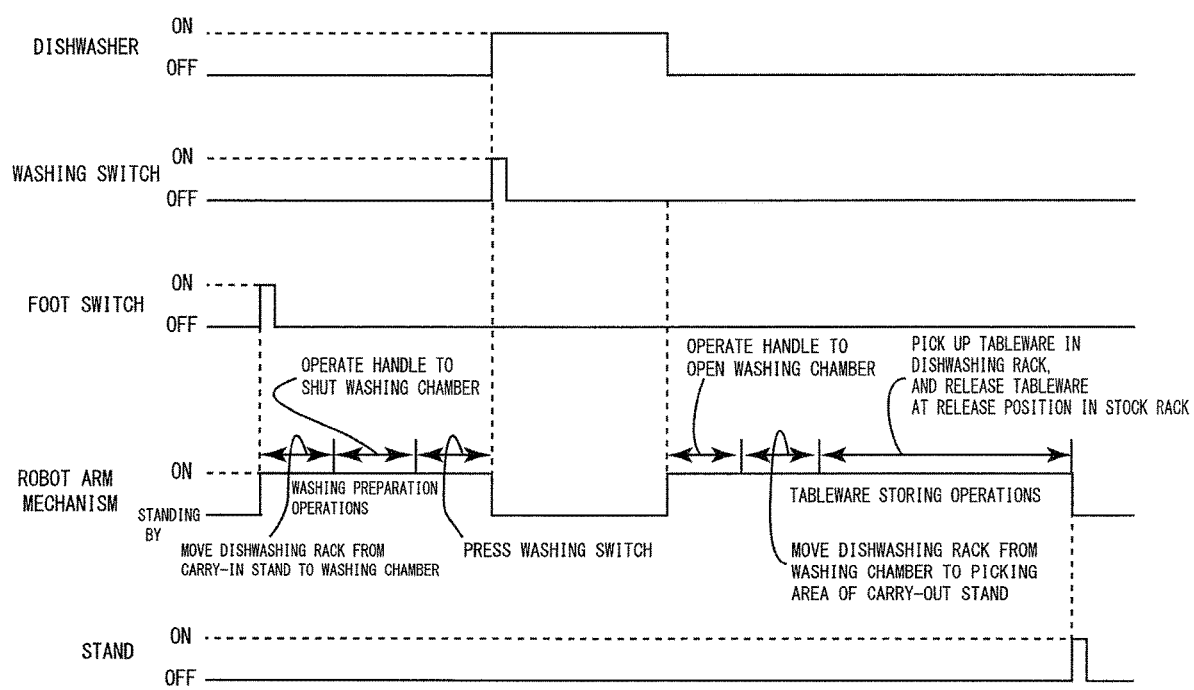
FIG. 7 is a timing chart illustrating operations of the dishwashing system according to the present embodiment.

FIG. 7 is a timing chart illustrating operations of the dishwashing system according to the present embodiment. As shown in FIG. 7, when the foot switch 104 is stepped on by a worker, such depression of the foot switch 104 serves as a trigger for the robot arm mechanism 130 to perform the washing preparation operations in accordance with the first task program. Further, when the robot arm mechanism 130 receives a washing completion signal, the reception of the washing completion signal serves as a trigger for the robot arm mechanism 130 to perform the tableware storing operations in accordance with the second task program. When there is no tableware in the picking area, in accordance with control by the system control section 121, the robot device 100 outputs a picking completion signal to the stand drive section 301. Upon receiving the picking completion signal, the stand drive section 301 drives, and by this means the stand 300 rotates, and the dishwashing rack 800 is collected in the collection rail 701. The dishwashing rack 800 that was collected in the collection rail 701 is returned from the carry-out stand 501 to the carry-in stand 401.

Figure 8A:
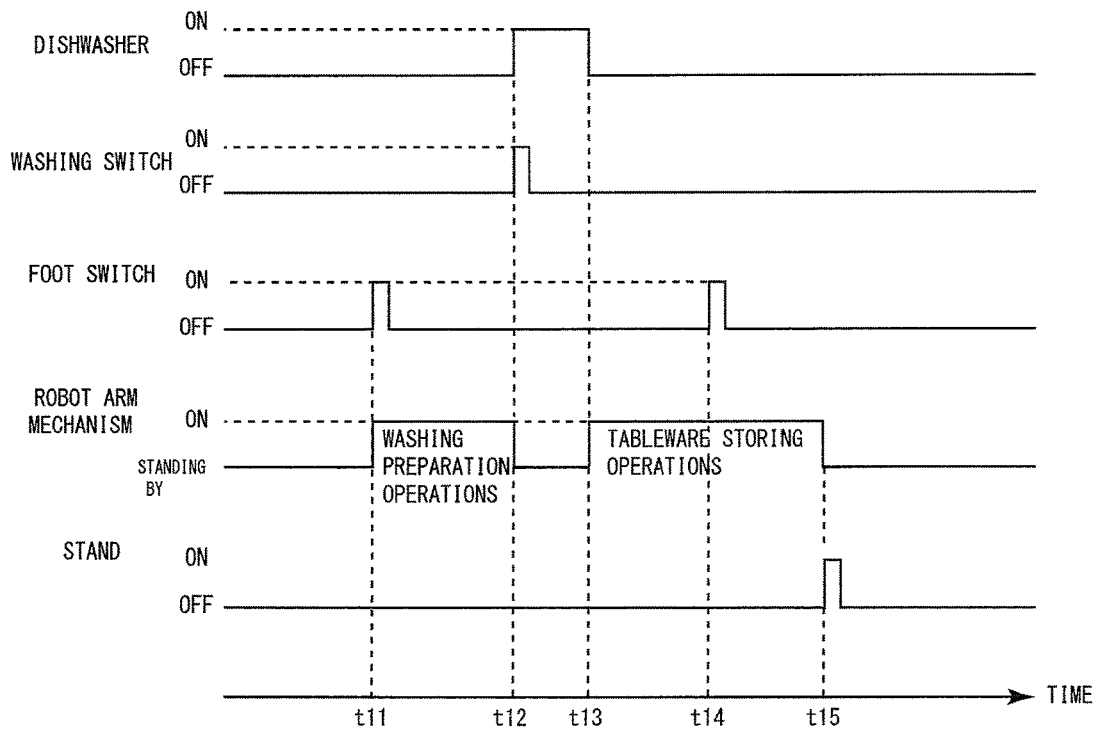
FIGS. 8A and 8B are timing charts for describing a plurality of task processing modes of the dishwashing system according to the present embodiment.
Figure 8B:
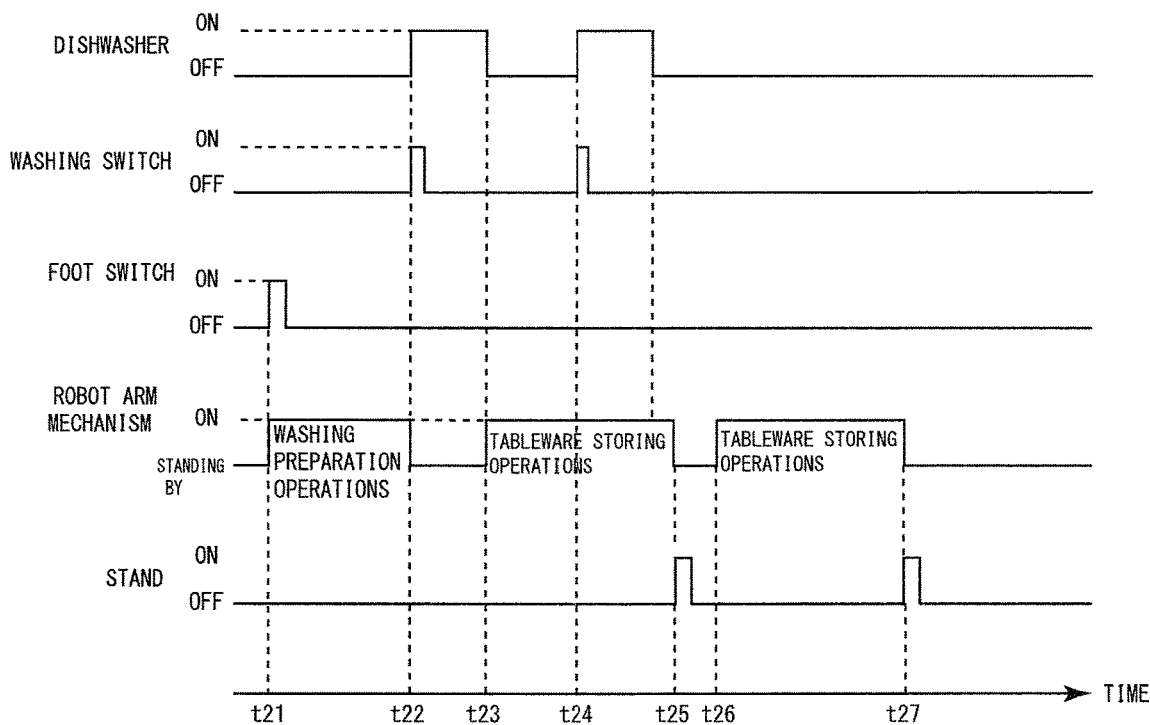

FIGS. 8A and 8B are timing charts for describing a plurality of task processing modes of the dishwashing system according to the present embodiment. The dishwashing system according to the present embodiment is equipped with a plurality of task processing modes, and in this example the modes are a safe processing mode, a sequential processing mode, and an interrupt processing mode. These processing modes can be appropriately switched by a worker.

The safe processing mode is a processing mode in which the level of safety of a series of washing operations by the robot arm mechanism is high. In the safe processing mode, while the robot arm mechanism 130 is performing washing preparation operations or tableware storing operations, in accordance with control of the system control section 121, the foot switch 104 is transitioned to an interlock state. At a time when task processing is not being performed by the robot arm mechanism 130, washing preparation operations by the robot arm mechanism 130 are not performed as long as the foot switch 104 is not stepped on. For example, as shown in FIG. 8A, even if the foot switch 104 is stepped on at a time t14 that is during a period in which tableware washing operations are being performed (time t13 to time t15), the robot device 100 does not accept a signal from the foot switch 104. Therefore, because operations by the robot arm mechanism 130 are started at a time when a worker is watching, on each occasion the worker can check whether the robot arm mechanism 130 starts the operations normally. This contributes to improving safety.

The sequential processing mode is a processing mode that realizes an improvement in the washing efficiency of the tableware. The sequential processing mode is a mode that performs sequential processing in the order in which a signal that serves as a trigger for executing the first task program and a signal that serves as a trigger for executing the second task program are input. For example, as shown in FIG. 8B, the robot device 100 receives a washing completion signal that was output from the dishwasher 200 at a time t24 which is during a period (time t23 to time t25) in which tableware storing operations that were accepted at a time t23 are being performed, and suspends the tableware storing operations. At a time t26 after a predetermined time period passes after the tableware storing operations are completed, the robot arm mechanism 130 automatically starts the tableware storing operations that had been suspended. Naturally, in a case where the foot switch 104 is stepped on at the time t24 also, the washing preparation operations are suspended, and at a time t26 after a predetermined time period passes after the tableware storing operations are completed, the robot arm mechanism 130 automatically starts the washing preparation operations that had been suspended. By this means, during a period in which the robot arm mechanism 130 is performing tableware storing operations, a worker may pack tableware into the dishwashing rack 800 and then step on the foot switch 104, and it is not necessary for the worker to wait until completion of the tableware storing operations by the robot arm mechanism 130 before stepping on the foot switch 104. Further, a worker can perform washing preparation operations in parallel with tableware storing operations by the robot arm mechanism 130. This improves the working efficiency of the workers and also improves the tableware washing efficiency.

The interrupt processing mode is a processing mode that realizes an improvement in the tableware washing efficiency. The interrupt processing mode is a mode in which, at a time that the foot switch 104 is stepped on during a period in which tableware storing operations are being performed by the robot arm mechanism 130, the robot arm mechanism 130 temporarily interrupts the tableware storing operations that are being executed, and after completing washing preparation operations, the robot arm mechanism 130 resumes the tableware storing operations that were interrupted. By this means, in the dishwashing system, it is possible to cause a picking operation by the robot arm mechanism 130 and a washing operation by the dishwasher 200 to be performed in parallel, and this contributes to improving the tableware washing efficiency.

Thus, although the robot arm mechanism 130 cannot perform washing preparation operations and tableware storing operations in parallel, the task processing mode can be set to the sequential processing mode so that the robot arm mechanism 130 and a worker can perform work cooperatively, such as by the worker performing tableware preparation operations and the robot arm mechanism 130 performing tableware storing operations, and thus washing preparation operations and tableware storing operations can be performed in parallel, and the tableware washing efficiency can be improved. Further, by setting the task processing mode to the interrupt processing mode, the robot arm mechanism 130 can interrupt tableware storing operations to perform washing preparation operations, and while the tableware is being washed in the dishwasher 200 the robot arm mechanism 130 can resume the tableware storing operations that were interrupted. Although washing preparation operations and tableware storing operations cannot be performed in parallel, the washing preparation operations and tableware storing operations can be performed with good efficiency.

Note that, in the dishwashing system according to the present embodiment, because it is possible for the robot arm mechanism 130 to perform all of the operations among a series of washing operations consisting of an operation to carry in the dishwashing rack 800, an operation to shut the washing chamber 210, an operation to press the washing switch 211, an operation to carry out the dishwashing rack 800, and an operation to pick tableware, the carry-in stand 401, the dishwasher 200, the carry-out stand 501 and the stock stand 601 are all arranged so as to be within the movable range of the robot arm mechanism 130. Therefore, among the aforementioned plurality of operations, the operations assigned to the robot arm mechanism 130 can be dynamically changed according to the number of workers, without changing the installation position of the robot arm mechanism 130. However, if the operations that the robot arm mechanism 130 performs are limited, all of the carry-in stand 401, the dishwasher 200, the carry-out stand 501 and the stock stand 601 need not necessarily be arranged so as to be within the movable range of the robot arm mechanism 130.

For example, when an operation assigned to the robot arm mechanism 130 is only the operation to carry in the dishwashing rack 800, or when the operations assigned to the robot arm mechanism 130 is the operation to carry in the dishwashing rack 800 and the operation to shut the washing chamber 210, or when the operations assigned to the robot arm mechanism 130 are limited to the operation to carry in the dishwashing rack 800, the operation to shut the washing chamber 210 and the operation to press the washing switch 211, it suffices that at least the carry-in stand 401 and the dishwasher 200 are arranged so as to be within the movable range of the robot arm mechanism 130. In this case, depression of the foot switch 104 serves as a trigger for the robot arm mechanism 130 to start the operations.

Further, when the operations assigned to the robot arm mechanism 130 is limited to an operation to carry out the dishwashing rack 800, it suffices that at least the dishwasher 200 and the carry-out stand 501 are arranged so as to be within the movable range of the robot arm mechanism 130. The carry-out operation by the robot arm mechanism 130 is started upon receiving the washing completion signal from the dishwasher 200.

In addition, when the operations assigned to the robot arm mechanism 130 is limited to a tableware picking operation, it suffices that at least the carry-out stand 501 and the stock stand 601 are arranged so as to be within the movable range of the robot arm mechanism 130. The start of a picking operation by the robot arm mechanism 130 is triggered when, upon a picking area image that is imaged by the picking camera 105 being processed by the image processing section 127, it is determined that tableware is present in the picking area and the tableware is stationary.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions

REFERENCE SIGNS LIST

104 . . . FOOT SWITCH, 105 . . . PICKING CAMERA, 110 . . . TABLEWARE SENSOR, 200 . . . DISHWASHER, 201 . . . WASHING MACHINE MAIN BODY, 203 . . . COLUMNAR SUPPORT, 205 . . . DOOR, 207 . . . HANDLE, 209, 405, 505 . . . CONVEYING ROLLERS, 210 . . . WASHING CHAMBER, 211 . . . WASHING SWITCH, 401 . . . CARRY-IN STAND, 501 . . . CARRY-OUT STAND, 601 . . . STOCK STAND, 701 . . . COLLECTION RAIL, 800 . . . DISHWASHING RACK, 900 . . . STOCK RACK.

The invention claimed is:
1. A dishwashing system, comprising:
a dishwasher that washes tableware contained in a dishwashing rack, inside a washing chamber;
a starting switch configured to be operated by a user;
a washing switch of the dishwasher;
a carry-in stand on which the dishwashing rack is placed, the dishwashing rack being carried into the washing chamber;
a carry-out stand on which the dishwashing rack is placed, the dishwashing rack being carried out from the washing chamber;
a stock stand for placing a stock rack in which to contain tableware that is washed by the dishwasher on;
a camera that photographs the carry-out stand; and
a robot device having a robot arm, the robot arm including a suction pad and a plurality of joints,
wherein:
the carry-out stand and the stock stand are arranged within a movable range of the robot arm;
the robot device has a controller including a processor;
triggered by a manual operation of the starting switch by the user, the controller is configured to control the robot arm to push the dishwashing rack to be carried from the carry-in stand into the washing chamber, move downward a handle of the dishwasher to shut the washing chamber, and manipulate the washing switch to cause the washing machine to start washing, in sequence;
triggered by input of a washing completion signal from the dishwasher upon completion of the washing, the controller is configured to control the robot arm to move upward the handle of the dishwasher to open the washing chamber, push the dishwashing rack to be carried out from the washing chamber to the carry-out stand, and pick up the tableware in the dishwashing rack with the suction pad and release the tableware inside the stock rack, in sequence, wherein:
the controller is configured to process an image that is photographed by the camera and determines a position of the tableware, a kind of the tableware, and a posture of the tableware;
select one release position from among a plurality of release positions based on a kind of the tableware and a number of stacked pieces of the tableware, so that the tableware is stacked in the stock rack according to each kind in a manner that takes a predetermined number of pieces of the tableware as an upper limit; and
control a transfer operation by the robot arm based on a position of the tableware, a posture of the tableware, and the selected release position, and
wherein:
the robot device further comprises
a plurality of reflection-type photoelectric sensors that are installed at the plurality of release positions, and
the controller is configured to count a number of releases of the tableware with respect to each of the plurality of release positions as the number of stacked pieces, and resets a count value to zero when the reflection-type photoelectric sensor enters an off state.

2. A dishwashing system, comprising:
a dishwasher that washes tableware contained in a dishwashing rack, inside a washing chamber;
a starting switch configured to be operated by a user;
a washing switch of the dishwasher;
a carry-in stand on which the dishwashing rack is placed, the dishwashing rack being carried into the washing chamber;
a carry-out stand on which the dishwashing rack is placed, the dishwashing rack being carried out from the washing chamber;
a stock stand for placing a stock rack in which to contain tableware that is washed by the dishwasher on;
a camera that photographs the carry-out stand; and
a robot device having a robot arm, the robot arm including a suction pad and a plurality of joints,
wherein:
the carry-out stand and the stock stand are arranged within a movable range of the robot arm;
the robot device has a controller including a processor;
triggered by a manual operation of the starting switch by the user, the controller is configured to control the robot arm to push the dishwashing rack to be carried from the carry-in stand into the washing chamber, move downward a handle of the dishwasher to shut the washing chamber, and manipulate the washing switch to cause the washing machine to start washing, in sequence;
triggered by input of a washing completion signal from the dishwasher upon completion of the washing, the controller is configured to control the robot arm to move upward the handle of the dishwasher to open the washing chamber, push the dishwashing rack to be carried out from the washing chamber to the carry-out stand, and pick up the tableware in the dishwashing rack with the suction pad and release the tableware inside the stock rack, in sequence,
wherein:
the controller is configured to process an image that is photographed by the camera and determines a position of the tableware, a kind of the tableware, and a posture of the tableware;
select one release position from among a plurality of release positions based on a kind of the tableware and a number of stacked pieces of the tableware, so that the tableware is stacked in the stock rack according to each kind in a manner that takes a predetermined number of pieces of the tableware as an upper limit; and
control a transfer operation by the robot arm based on a position of the tableware, a posture of the tableware, and the selected release position, and
wherein:
the robot device further comprises:
a second camera that photographs the stock stand; and
the controller is configured to count a number of releases for each of the plurality of release positions as the number of stacked pieces, and resets a count value to zero based on a result of image processing of an image photographed by the second camera.

3. A dishwashing system, comprising:
a dishwasher that washes tableware contained in a dishwashing rack, inside a washing chamber;
a starting switch configured to be operated by a user;
a washing switch of the dishwasher;
a carry-in stand on which the dishwashing rack is placed, the dishwashing rack being carried into the washing chamber;
a carry-out stand on which the dishwashing rack is placed, the dishwashing rack being carried out from the washing chamber;
a stock stand for placing a stock rack in which to contain tableware that is washed by the dishwasher on;
a camera that photographs the carry-out stand;
a robot device having a robot arm, the robot arm including a suction pad and a plurality of joints; and
a touch panel operable by a worker,
wherein:
the carry-out stand and the stock stand are arranged within a movable range of the robot arm;
the robot device has a controller including a processor;
triggered by a manual operation of the starting switch by the user, the controller is configured to control the robot arm to push the dishwashing rack to be carried from the carry-in stand into the washing chamber, move downward a handle of the dishwasher to shut the washing chamber, and manipulate the washing switch to cause the washing machine to start washing, in sequence;
triggered by input of a washing completion signal from the dishwasher upon completion of the washing, the controller is configured to control the robot arm to move upward the handle of the dishwasher to open the washing chamber, push the dishwashing rack to be carried out from the washing chamber to the carry-out stand, and pick up the tableware in the dishwashing rack with the suction pad and release the tableware inside the stock rack, in sequence,
wherein:
the controller is configured to process an image that is photographed by the camera and determines a position of the tableware, a kind of the tableware, and a posture of the tableware;
select one release position from among a plurality of release positions based on a kind of the tableware and a number of stacked pieces of the tableware, so that the tableware is stacked in the stock rack according to each kind in a manner that takes a predetermined number of pieces of the tableware as an upper limit; and
control a transfer operation by the robot arm based on a position of the tableware, a posture of the tableware, and the selected release position, and
wherein the controller is configured to count a number of releases for each of the plurality of release positions as the number of stacked pieces of the tableware, and resets a count value to zero in accordance with an operation performed at the touch panel.

4. The dishwashing system according to claim 1, wherein the controller is configured to change the release position when the number of stacked pieces reaches the predetermined number of pieces.

5. The dishwashing system according to claim 1, wherein:
the controller is configured to notify a fact that the number of stacked pieces reached the predetermined number of pieces by means of one of either light, sound, or vibration; when the number of stacked pieces reaches the predetermined number of pieces.

6. The dishwashing system according to claim 2, wherein the controller is configured to change the release position when the number of stacked pieces reaches the predetermined number of pieces.

7. The dishwashing system according to claim 2, wherein:
the controller is configured to notify a fact that the number of stacked pieces reached a predetermined number of pieces by means of one of either light, sound, or vibration; when the number of stacked pieces reaches a predetermined number of pieces.

8. The dishwashing system according to claim 3, wherein the controller is configured to change the release position when the number of stacked pieces reaches the predetermined number of pieces.

9. The dishwashing system according to claim 3, wherein:
the controller is configured to notify a fact that the number of stacked pieces reached a predetermined number of pieces by means of one of either light, sound, or vibration; when the number of stacked pieces reaches a predetermined number of pieces.

* * * * *